(12) United States Patent
Sasso et al.

(10) Patent No.: US 6,397,635 B1
(45) Date of Patent: Jun. 4, 2002

(54) PLUNGER MECHANISM FOR THE PRESSING OF GOBS OF MOLTEN GLASS IN THE BLANK MOULD OF AN I.S. MACHINE FOR THE PRODUCTION OF HOLLOW WARE

(75) Inventors: Daniele Sasso, Vicenza; Mirco Scabio, Monticello Conte Otto; Claudio Bellina, Caldogno, all of (IT)

(73) Assignee: BDF-Boscato & Dalla Fontana S.p.A., Vicenca (IT)

( * ) Notice: Subject to any disclaimer, the term of this patent is extended or adjusted under 35 U.S.C. 154(b) by 0 days.

(21) Appl. No.: 09/516,506

(22) Filed: Mar. 1, 2000

(30) Foreign Application Priority Data

May 6, 1999 (IT) .......................................... TO99A0367

(51) Int. Cl.[7] .............................................. C03B 11/16
(52) U.S. Cl. ................................ 65/160; 65/356; 65/362
(58) Field of Search .......................... 65/158, 160, 356; 65/362; 318/135

(56) References Cited

U.S. PATENT DOCUMENTS 4,613,352 A * 9/1986 Krumme et al. .............. 65/158
4,662,923 A * 5/1987 Vajda et al. ................ 65/29.15
5,139,559 A   8/1992 Kozora ......................... 65/158
5,266,093 A * 11/1993 Konishi et al. ............... 65/158
5,644,227 A * 7/1997 Geisel ..................... 324/207.24
5,707,414 A * 1/1998 Leidy .......................... 65/158

FOREIGN PATENT DOCUMENTS

| DE | 34 01 465 | 1/1985 |
| EP | 0 165 012 | 12/1985 |
| EP | 0 488 136 | 6/1992 |
| EP | 0 779 248 | 6/1997 |
| EP | 0 789 004 | 8/1997 |
| WO | WO 94 22776 A | 10/1994 |
| WO | WO 94 27922 A | 12/1994 |

* cited by examiner

*Primary Examiner*—Sean Vincent
(74) *Attorney, Agent, or Firm*—Sughrue Mion, PLLC

(57) ABSTRACT

Plunger mechanism for the pressing of gobs of molten glass in the blank mould of an I.S. machine for the production of hollow ware, characterized in that the driving and controlling of the up and down movements of the pressing plunger is effected by a linear electric motor, conveniently a tubular-type linear motor.

4 Claims, 3 Drawing Sheets

PLUNGER MECHANISM FOR THE PRESSING OF GOBS OF MOLTEN GLASS IN THE BLANK MOULD OF AN I.S. MACHINE FOR THE PRODUCTION OF HOLLOW WARE

BACKGROUND OF THE INVENTION

The present invention relates to a plunger mechanism used in machines for forming hollow glass articles (known as I.S. machines), whose function is to press the gobs of molten glass inside the blank mould.

The prior art includes a variety of these devices capable of working in Single Gob, Double Gob, Triple Gob and Quadruple Gob operation, all operated by pneumatic cylinders controlled by an electronic programmer via 3-way 2-position valves.

The recent plunger mechanisms used in all I.S. machines (see documents Emhart GB-B-2,058,042B, WO 94/22776, EP-A-761,611 and EP-A-802,167, document Heye WO 94/27922) take the form of double-acting pneumatic cylinders controlled by solenoid distributing valves under the control of an electronic programmer.

There also exists a document Owens EP-A-789,004 in which the linear motion of the plunger is provided by a motor with a hollow shaft in which there operates a roller screw which engages on the female thread on the inside of the hollow shaft. Control of this device is therefore electrical with motion being converted from rotary to linear by means of a roller screw and with position sensing by a resolver.

The present-day technology of pneumatic plunger mechanisms works extremely well in Blow-and-Blow production processes in which the blank is first formed by pneumatic compression of the glass inside the blank mould (to form the neck) and then by blowing into the glass through the plunger mechanism (to form the blank). The function of the plunger mechanism in this case is purely that of keeping the plunger in position while the neck is being formed (the raised or "settle blow" position) and of forming the blank (the lowered or "counter blow" position), executing a maximum stroke of about 40 mm.

In Press-and-Blow and Narrow Neck Press-and-Blow production processes, the function of the plunger mechanism is to form the blank completely by pushing into the glass which has been poured into the blank mould. During this process the stroke of the plunger varies from 165 mm to 210 mm and during the whole of the compression stroke and part of the down stroke the plunger is in direct contact with the glass in the plastic state.

Control of the end-of-pressing position and of the up and down velocities of the plunger become extremely important in the Wide Neck Press-and-Blow (jars) and Narrow Neck Press-and-Blow (bottles) processes.

In the plunger mechanism the end-of-pressing position is determined by the amount of molten glass poured into the blank mould and therefore by the weight of the gob cut off. A negative variation of weight results in a longer plunger stroke while a positive variation of weight results in a shorter plunger stroke; this because the stroke of the plunger determines the filling volume of the blank mould. Sensing the variation of the plunger stroke determines the variation of the weight of the gob and hence the correction to be applied to the gob forming mechanism. In conventional plunger mechanisms this sensing is possible only by fitting a linear sensor inside the cylinder to monitor the plunger stroke (see document Heye WO 94/27922), whereas in standard mechanisms this is impossible.

Another problem in pneumatically controlled mechanisms is determining the velocity of displacement of the plunger which can cause tears on the surface of the glass where it contacts the plunger, thus reducing the mechanical strength of the finished container.

The control of velocity in the cylinders of present-day plunger mechanisms is normally by means of a needle valve which regulates the flow of compressed air during cylinder discharge. This type of regulation creates a nonlinearity of the pressures upstream and downstream of the piston, resulting in poor control of the velocity of displacement.

It is known that the movement of a pneumatic cylinder is difficult to control and for this reason a number of manufacturers use electronically controlled proportional valves capable of controlling the pressures, inside the cylinder, to follow a curve defined through a PC or PLC (document Emhart WO 94/22776).

The use of a motor with a hollow shaft and a Satellite-roller screw (document Owens EP-A-789,004) has the advantage of introducing electronic control over the stroke of the plunger but has the disadvantage that motion has to be converted from rotary to linear by a satellite-roller screw. This gives decidedly poor transmission efficiency, and a twisting torque is transmitted to the rod of the punch which must be counteracted by a system of linear guides.

Another disadvantage with using a servo-guided roller screw is the wear over time of the linear guide which compromises the correct alignment of the plunger with the blank mould, which is vitally important in press-and-blow processes.

SUMMARY OF THE INVENTION

The object of the invention is to provide a plunger mechanism that eliminates the mechanical problems described above and allows process control which is currently not possible with pneumatic cylinders.

According to the invention this object is achieved through the features defined in claim 1. Additional secondary features are set forth in claims 2–6.

The use of an electric servomotor allows continuous monitoring of the velocity of displacement of the plunger throughout its stroke. Moreover, by monitoring the torque of the motor during the final pressing stroke it is possible to monitor the pressing pressure and leave the position free in such a way that by means of the linear position transducer built into the motor, it is possible to verify the end-of-pressing position and therefore calculate in real time the variation in the weight of the gob of molten glass. The position signal, after processing, can be used to operate the gob weight sensing device present in the gob forming mechanism (usually known as the feeder).

The use of an electric servomotor also allows the velocity of displacement of the plunger to be monitored by means of the programming of electronic cams modifiable directly by the operator of the forming machine. It also introduces a movement which is constant and repeatable in time, unlike compressed air-operated mechanisms where the properties of the compressible gas do not guarantee that the movements will be constant over time.

The idea on which the invention is based is in practice to eliminate the pneumatic cylinder without using devices that can convert a motion from rotary to linear, by directly using a linear-type electric control device, for which a brushless linear servomotor of tubular type is suitable. The tubular-type linear motor utilizes the principle of the linear motor with the difference that the windings and magnets are unrolled linearly into a toroidal shape rendering the motor similar to a pneumatic cylinder, instead of being unrolled linearly into a plane.

The advantage of employing a linear servomotor of wound-rotor type in the plunger mechanism is that the operation of the motor shaft is precisely balanced, suffering no radial thrust relative to the axis of the motor.

The attractive force generated by the toroidal magnets of the motor (moving part) on the toroidal windings of the motor (static part) are balanced without introducing any force perpendicular to the axis of the motor shaft.

In practice the tubular-type linear motor has the same functionality as a pneumatic cylinder but with all the known advantages of electrical drive with electronic control of the displacement.

The axial force developed by the linear motor will have a single linear component directed along the axis of the motor; this will eliminate the perpendicular components typical of flat linear motors and the twisting components typical of recirculating ball screws or satellite-roller screws.

The tubular-type linear motor, which will find application in carrying out the present patent, must be a motor designed for this specific application because the dimensions of the finished mechanism must be extremely small in order to allow it to be housed inside the structure of the machine module where it is currently used (see the standard linear motor produced by Indramat-Mannesman).

The present invention therefore provides a plunger device comprising a height-adjustable lower support for receiving the tubular-type linear motor which controls the up and down movements of the pressing plunger. The said mechanism may be constructed with a single motor for Single Gob processes, with two motors for D.G. processes, with three motors for T.G. processes and with four motors for Q.G. processes.

The device allows compressed air cooling of the plunger, as in the pneumatic mechanism, using air fed through the lower plate of the motor. Fixed to the lower plate of the motor is a cooling tube which runs through the interior of the hollow shaft of the linear motor.

To prevent cooling air from being discharged inside the motor there are dynamic seals between the cooling tube and the motor shaft.

Cooling air is discharged through the upper cylinder of the plunger.

Monitoring of the switching of currents and of the motor torque is either by means of Hall sensors mounted on the windings or by means of an analogue linear transducer mounted inside the motor. The analogue linear transducer is of the coil type and is formed on the cooling tube. The reading of the variation of inductance between tube and motor shaft, during the relative movement, provides the position signal which is used both to control the motor and as a feedback signal for gob weight control. In the gob weight control the position feedback is used to operate the drive control board which operates the motor for adjusting the height of the rotating tube (gob weight adjustment system present in the gob forming mechanisms).

BRIEF DESCRIPTION OF THE DRAWINGS

The invention will be described with reference to the attached drawings, which illustrate a non-restrictive type of embodiment. In the drawings.

DETAILED DESCRIPTION OF THE INVENTION

Figure 1:
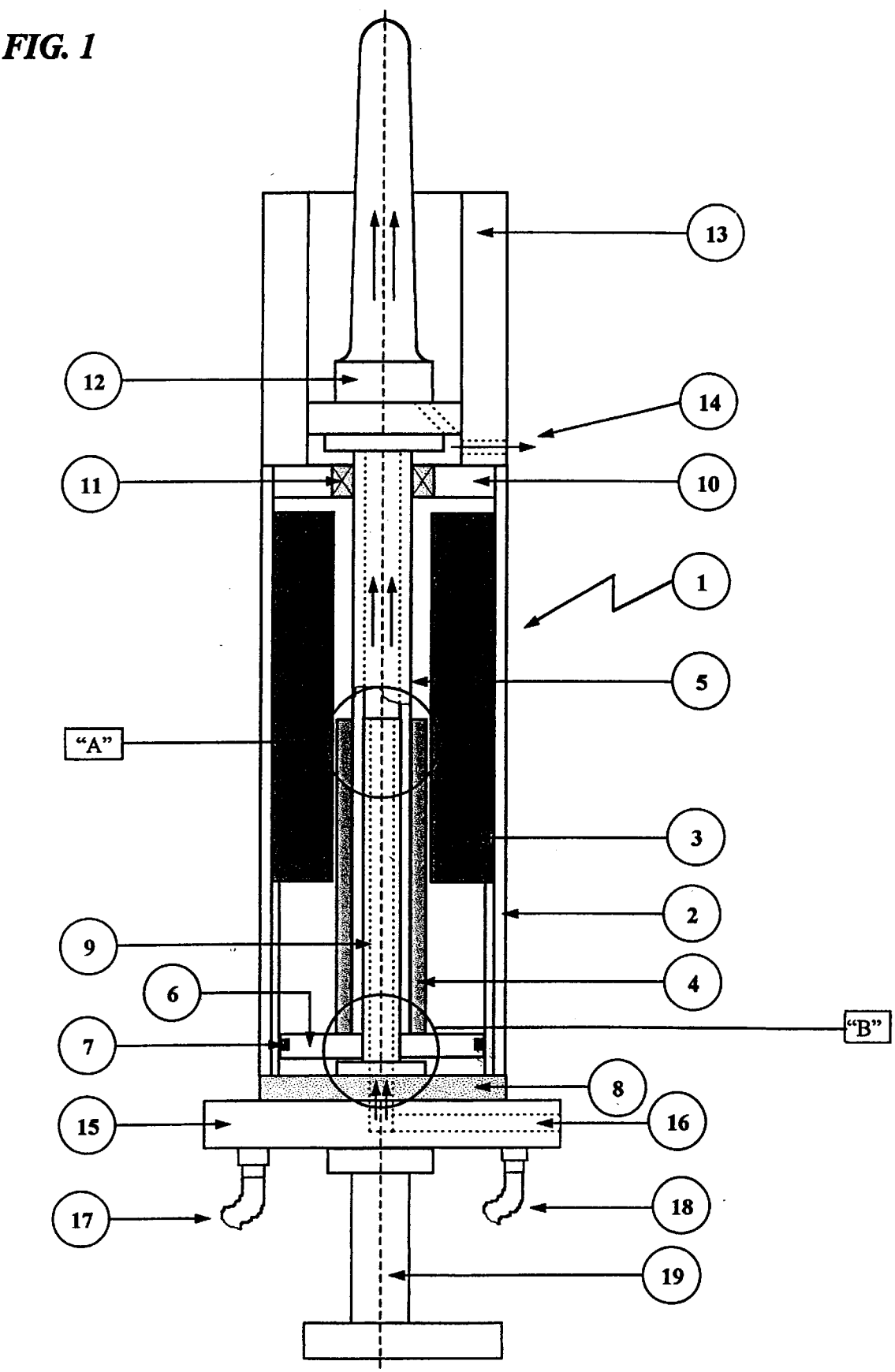
FIG. 1 illustrates the mechanism of the plunger in all its main components.

Referring to FIG. 1, the mechanism 1 may be composed of a single motor 2 for single gob forming processes, or of two or more motors for multiple gob processes (double, triple, quadruple). The mechanism 1 is composed of 3 basic parts which are the height-adjustable lower support 19 (the said device is not described here in detail as it is already in widespread use in the pneumatic mechanism), the linear motor 2 and the upper guide cylinder 13. The tubular-type linear motor is suitable in dimensions and shape to be installed in the space currently used for the pneumatic mechanism. Larger dimensions cannot be contemplated because of the restricted space available inside the section module.

The mechanism 1 therefore takes the form of a cylinder with a central linearly moving shaft 5 on which the magnets 4 are positioned while the windings 3 are mounted on the motor casing. The moving central shaft is internally hollow to allow passage of the cooling air 16 for the pressing plunger 12. The central shaft is guided linearly by a linear bush 11 located on the forward flange 10 of the motor and by a second, rear linear guide which may be constructed, as in the figure, as a cylindrical guide 6 and guide ring 7 integral with the central shaft 5. Other rear and forward guide systems may of course be used according to design requirements.

Figure 2:
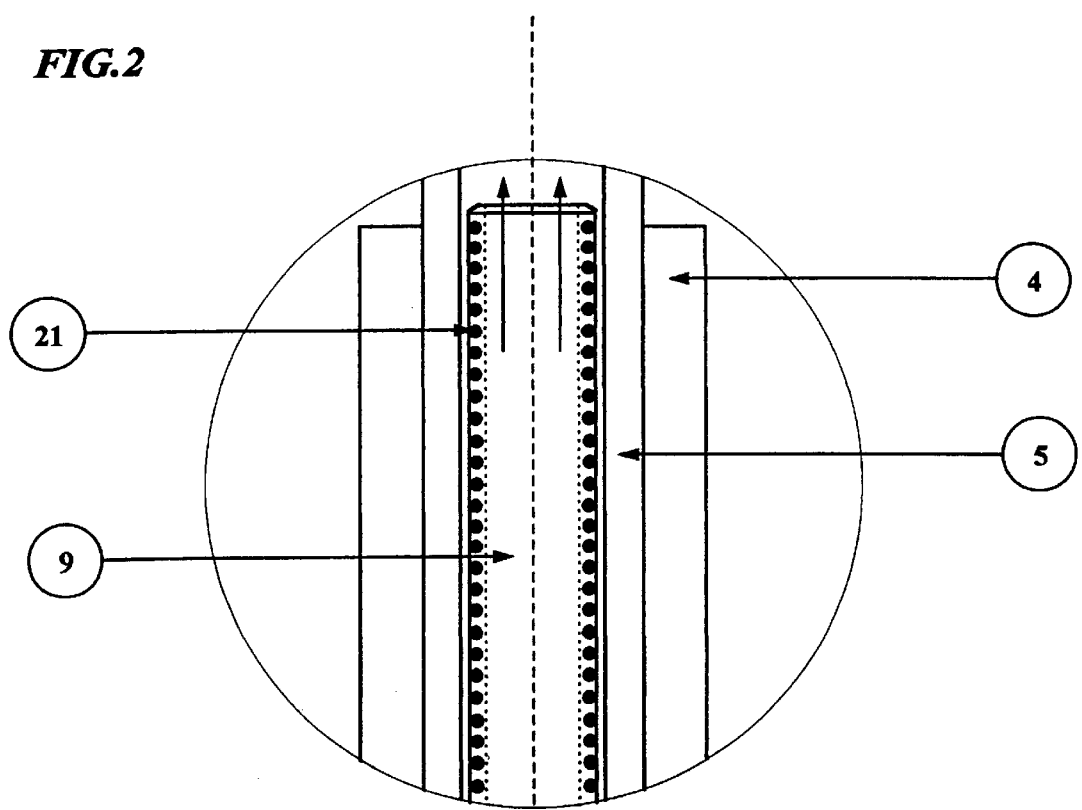
FIG. 2 illustrates the linear sensor formed in the cooling tube (enlarged detail "A" in FIG. 1).
Figure 3:
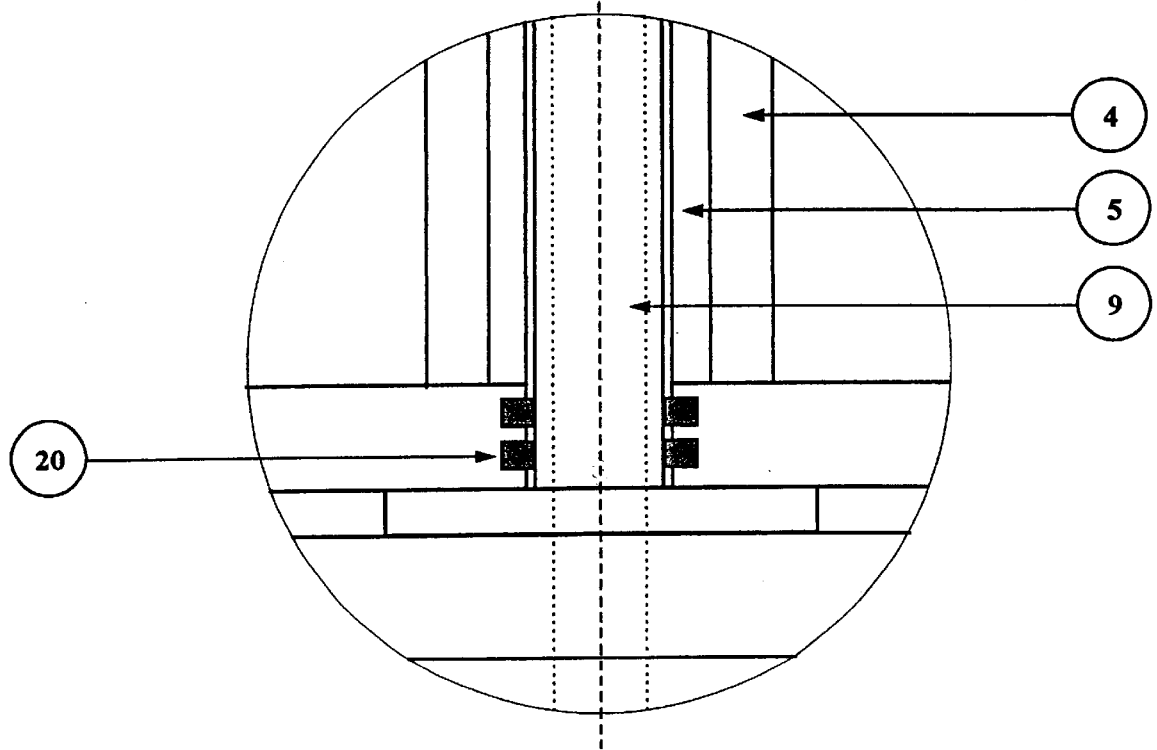
FIG. 3 illustrates the air sealing system between the plunger cooling tube and the shaft of the tubular-type linear motor (enlarged detail "B" in FIG. 1).

Housed inside the central shaft 5 is the cooling tube 9 fixed to the lower cover 8 of the motor (see FIG. 2). Leaktightness between the central shaft 5 of the motor 2 and the internal cooling tube 9 is ensured by dynamic seals 20 in the piston 6 (see FIG. 3).

Cooling of the plunger is by means of a compressed air supply line 16 through the interface plate 15 while discharge 14 is through the upper cylinder 13. The mechanism is fastened by screws (not shown in the drawing) to the baseplate 15 of the height-adjustable support 19, thus making the plunger mechanism 1 readily interchangeable. The interface plate 15 also takes the power connector 17 and the connector of the position transducers 18 for driving and monitoring the mechanism 1.

The upper portion of the mechanism is composed of the guide cylinder 13 whose function is to guide the plunger 12 linearly during its upward stroke. In the upper cylinder 13 is the discharge hole 14 for the cooling air 16 for the plunger 12.

A linear transducer formed inside the linear motor is used for position sensing.

FIG. 2 shows the analogue linear transducer which takes the form of a coil 21 wound on the cooling tube 9 integral with the casing of the motor 2. Movement of the motor shaft 5 causes a variation of the inductance in the coil 21, and this signal is read to supply the absolute position of the motor shaft 5.

Figure 4:
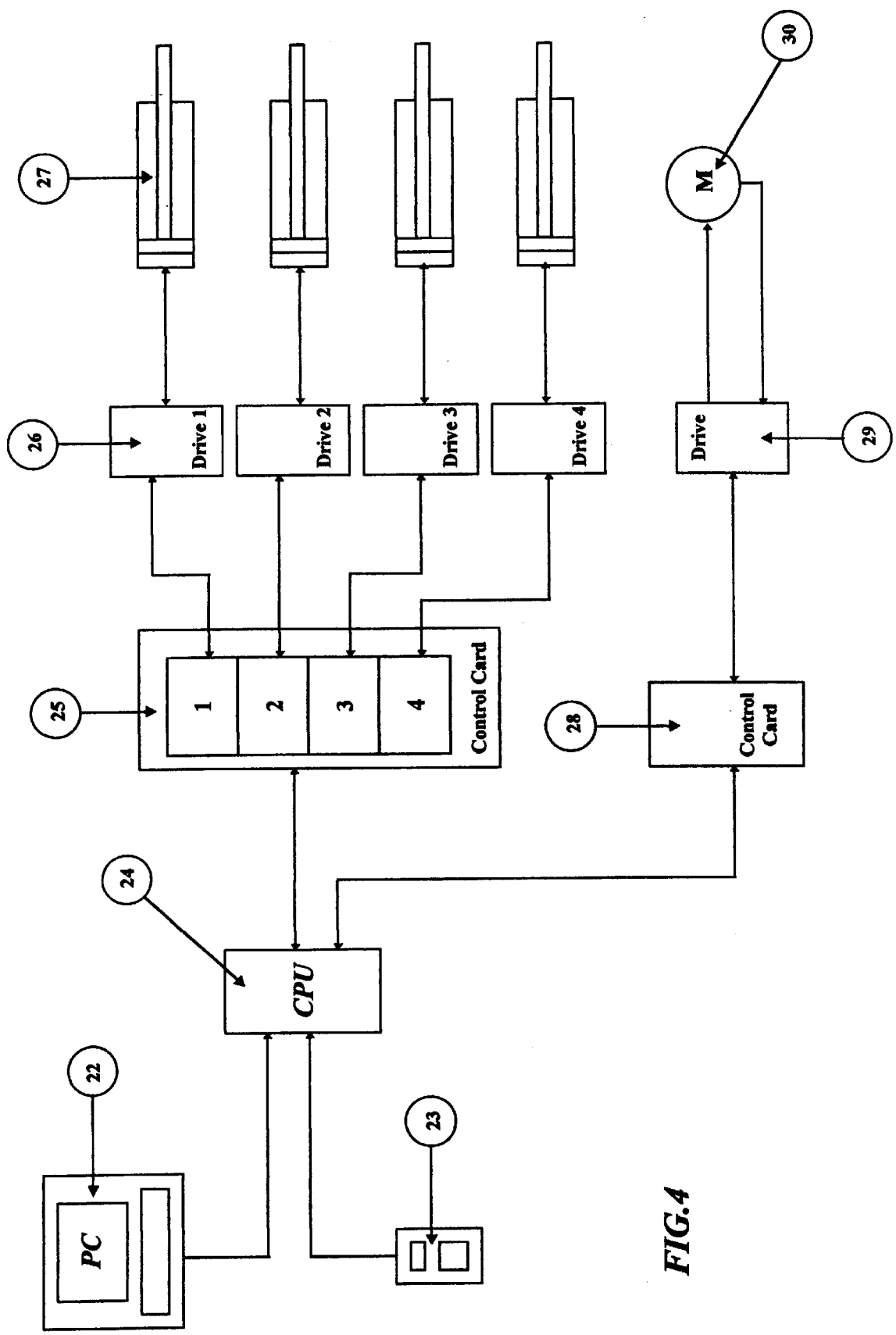
FIG. 4 shows a block diagram of the control system for the present mechanism and for the gob weight control system.

FIG. 4 illustrates the driving and sensing system of the plunger mechanism forming the subject of the present invention.

The interface with the operator consists of e.g. a computer 22 or a portable terminal 23 with a serial connection to a CPU card 24 able to program the operation of the tubular-type linear motor or motors (up to four). The CPU card 24 sends the programming data to the control card 25 of the tubular motor. The control card 25 is divided into 4 sections each of which sends reference signals and receives feedback signals from the respective drives 26 of the controlled motors 27.

The motor drives 26 in turn control their respective tubular motors 27 by switching the currents in the windings 3 of the tubular motors. The switching of the current and of the motor torque is monitored either by Hall sensors mounted in the windings 3, or by the analogue linear transducer 21 mounted inside the motor (see FIG. 2). The sensing feedback is closed on the motor drives 26. The CPU 24 observes any errors in the final position of the plunger and causes the control card 28 to send error reference signals and receive feedback signals from the drive 29 of the motor 30 which controls the position of the gob weight adjusting device mounted on the gob forming mechanism.

What is claimed is:

1. A plunger mechanism for the pressing of gobs of molten glass in the blank mould of an I.S. machine for the production of hollow ware, said plunger mechanism comprising a pressing plunger and means for driving and controlling up and down movements of said pressing plunger, wherein said driving and controlling means comprise a linear electric motor, wherein said linear motor is a tubular linear motor, and wherein said linear motor has a hollow shaft to allow passage of cooling air to said pressing plunger.

2. Plunger mechanism according to claim 1, wherein said linear motor has a casing, further comprising a cooling tube fixed to said motor casing and extending through said hollow shaft, and linear position transducer means provided inside said motor and including a coil wound on said cooling tube.

3. Plunger mechanism according to claim 1, further comprising detecting means to detect the position and torque of said motor, whereby the profiles of the up and down movements of said plunger, and the waiting and displacement times thereof, are made programmable.

4. Plunger mechanism according to claim 1, wherein said detecting means, during an end-of-pressing phase, provide a feedback for control of the gob weight.

* * * * *